Figure 1:
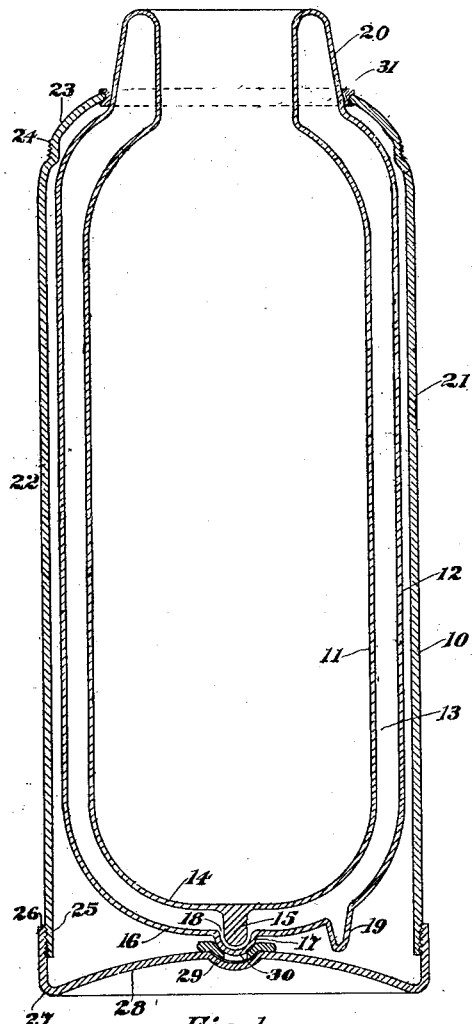

July 3, 1928.  
C. E. BULTMAN  
INSULATED VESSEL  
Filed Aug. 19, 1922  
1,676,004

Fig.1ᵃ

WITNESS  
Erich M. Rohl.

INVENTOR.  
Charles E. Bultman

Patented July 3, 1928.

1,676,004

UNITED STATES PATENT OFFICE.

CHARLES E. BULTMAN, OF CHICAGO, ILLINOIS; IDA MAI BULTMAN, EXECUTRIX OF SAID CHARLES E. BULTMAN, DECEASED, ASSIGNOR TO ERNEST D. MacDOUGALL, OF CHICAGO, ILLINOIS.

INSULATED VESSEL.

Application filed August 19, 1922. Serial No. 582,962.

The invention relates to insulated vessels and more particularly of the kind comprising double walls of glass united with each other at the mouth of the vessel and inclosing a rarefied space between them.

The art of insulated vessels has received the close attention of inventors not only with respect to the manufacture thereof, or as regards the efficiency and reliability thereof, but also relative to the proper spacing of the two walls so as to insure efficient insulation.

The provision of proper spacing means for the two walls of insulated vessels, however, has not been solved in an unobjectionable manner because of the fact that the very spacing means constituted heat conductors or the employment thereof entailed additional expenses in the manufacture of such vessels.

The broad object of the invention constitutes therefore the provision of spacing means which not only is free of the defect of acting as heat conductors but actually reduces the cost of manufacturing insulated vessels of the kind specified.

A further object aims at providing spacing means which does not establish any contact between the inner and outer walls of the vessel, there being only the usual union of the walls at the neck of the vessel whereby the inner wall is pendently supported by the outer wall capable of executing incremental movements under the varying temperature conditions attendant the uses to which the vessel is put.

It is another object of the invention to construct the spacing means such that upon external violent shocks the inner wall may execute only a limited pendular movement precluding thereby breakage thereof.

The invention has also a novel feature, the arrangement of the two walls such that a silvering solution may be injected into the interspace between the walls and completely coat the inner surface of the outer wall and the outer surface of the inner wall.

Incidentally the complete absence of contact between the two walls precludes heat conduction.

It is also an object of the invention to provide the bottom of the inner wall with a projection and the outer wall with a socket cooperating with said projection to loosely receive the same and thus permitting a limited oscillating movement.

It is a further object of the invention to utilize the plug and socket arrangement for the purpose of centering the two walls or vessels with respect to one another.

A still further object is the provision of a plug on the bottom of the inner wall constituting an added mass to the outer surface of the inner wall so that the inner surface of the inner wall is continuous and uniform and is distinguished by the absence of ridges, crevices or dents which could form repositories for impurities accessible only with difficulty for cleaning.

Another object aims at constructing the plug and socket such that normally there is no contact between these parts and yet establishing a contact and obviating dangerous movement when the elasticity of the glass permits an excessive movement which could result in destruction of the vessel.

It is still a further object of the invention to provide a vessel comprising an inner and an outer receptacle united only at the mouth, having proper spacing from each other and yet being completed by a single draw necessary for welding the necks of the two receptacles together.

A still further object constitutes the provision of a single means adapted to act as a spacer and centering device for the double walled vessel.

It is a further object to provide an improved method for manufacturing vessels of the kind specified.

With these and many other equally important objects in view which will become apparent as the description of the invention proceeds, the latter comprises the means described in the following specification, particularly pointed out in the claims appended thereto and illustrated in the drawing in which Figure 1 is a sectional elevation of a vessel constructed in accordance with my invention.

Figure 1$^a$ is an enlarged detail.

Figure 2:
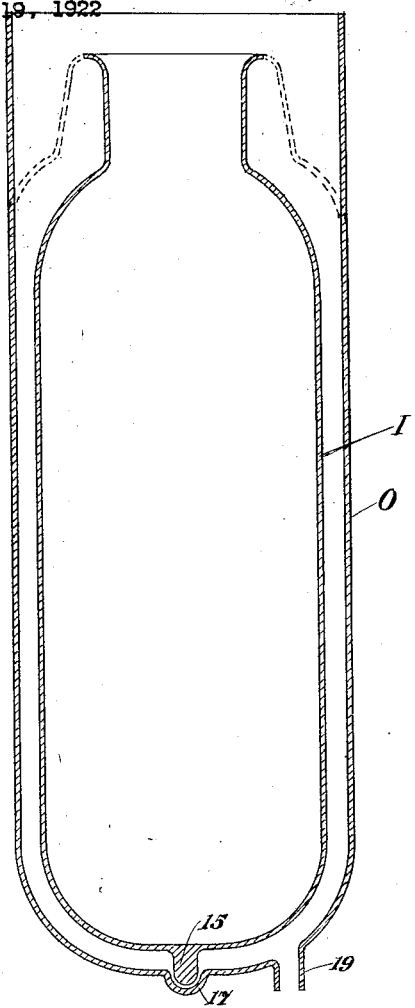
Figure 3:
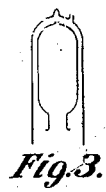
Figure 4:
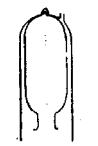
Figure 5:
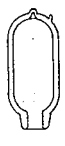

Figure 2 indicates the form and arrangement of the inner and the outer containers prior to the completion of the vessel and Figures 3 to 5 diagrammatically depict the method of manufacturing the improved vessel.

The vessel generally designated by 10 is primarily intended for the storing of food or liquids for the purpose of maintaining the same at practically constant temperature for a considerable length of time. The vessel comprises an inner container 11 and an outer container 12 defining therebetween an interspace 13 of rarefied air as will be readily understood by those versed in the art.

The inner container 11 has formed at the bottom 14 and depending therefrom a protuberance or plug 15 which is arranged co-axial with the container and is formed integral with the bottom and originates from the outer surface thereof. Attention is called to the fact that the inner surface of the inner container is not in any manner changed or influenced by the presence of the plug 15 but its continuity, smoothness and uniformity is the same as if the plug were absent. The outer container 12 is equipped at its bottom 16 with a depression or socket 17 also arranged co-axial with the container and of a size to loosely receive the lower end of the plug so that with the containers arranged in functional position, as shown in Figure 1, there is a slight clearance 18 between the plug and socket. Thus throughout the interspace 13 there is no actual contact between the containers.

The provision of a single plug and socket at the longitudinal axis of the containers has many advantages not only as far as the efficiency of the vessel is concerned but is of tremendous importance in the manufacturing thereof as will be hereinafter further referred to.

The outer container is formed with the usual tip 19 through which the air in the space 13 is exhausted, which subsequent to the exhaustion of air is sealed.

In constructing the vessel two blank containers are employed of the forms shown in Figure 2. The outer blank designated O is already formed with the depression 17 and the inner blank designated I has essentially the shape which it possesses when the vessel is completed.

In assembling the two blanks O and I they are arranged in inverted position as will seen from Figures 3 to 5, the container O being arranged in a suitable chuck and the inner container I being inserted into the outer container as appears from Figure 3. The insertion is continued until the plug 15 enters the depression 17 and upon physical contact of these parts indicated by a click they are supported in such position for completion of the vessel. Thereupon the outer container is subjected to a welding heat and by a single draw a union is obtained at the mouth of the vessel with the inner container as will readily appear from Figure 5. Due to the temperature conditions which prevail during the union of the two containers O and I and the subsequent cooling a contraction will take place whereby in the finished form the projection 15 will not be in contact with the depression 17 and thus leave the clearance 18.

From the foregoing it follows that the vacuum space 13 is continuous throughout the vessel and that at no point is there an actual contact between the inner and outer container except of course at the mouth where the union is established. The finished vessel consequently is composed of two walls and the inner wall enters with the projection 15 into the depression 17 without, however, contacting with the latter so that the inner container has a slight pendular movement under the influence of external shocks. Should the pendular movement become excessive, the contact between the parts 15 and 17 prevents such movement and precludes actual breakage of the vessel.

Furthermore the absence of contact between the inner and outer wall as indicated hereinabove prevents heat conduction and consequently increases the efficiency of the device. Furthermore the continuity of the interspace 13 affords the opportunity of completely silvering the surfaces of said space which is an advantageous feature because it improves the appearance of the vessel.

Attention is called to the fact that in uniting the outer container with the inner container the neck of the outer container is formed so that it slightly tapers with the diameter increasing from the mouth toward the body of the container as indicated at 20.

The vessel is employed in conjunction with a casing generally indicated by 21. The casing comprises a cylindrical portion 22 which at the upper end is spherical as indicated at 23 and is provided with a threaded portion 24 to afford securing thereto of a cup (not shown). The lower open end 25 of the casing 21 is equipped with threads 26 and secured to the lower end is a base member 27 which is formed with a concave bottom 28 equipped at the center with a depression 29 to cooperate with the depression 17 of the outer container. Between the depressions 17 and 29 a layer 30 of resilient material is interposed which fits both depressions and is apertured at the center.

A ring 31 of resilient material surrounds the neck and the inner face 32 of the ring is formed to fit the taper of the neck of the vessel. The ring 31 is equipped with a circumferential groove 33 into which extends the upper edge of the casing.

From the foregoing it follows that upon threading of the case member 37 onto the casing 21 the vessel by reason of the engagement between the casing and the ring 31 is formed downwardly so that there is a good contact between the parts 17, 29 and 30 affording thereby centering of the vessel with respect to the casing. Furthermore, the provision of the resilient layer insures sufficient resiliency so that breakage of the vessel will not occur, nor will extraneous shocks be transmitted to the vessel. On the other hand the parts interfit well and the entire container presents a compact and rather stable arrangement which is devoid of loose and vibrating parts and thus facilitates handling and use of the vessel.

The provision of the plug and socket respectively on the inner and the outer container brings about a simple and inexpensive way of manufacturing the insulated vessel. It suffices to insert the inner and the outer container to obtain automatically proper centering and spacing of the two containers and this is reliably indicated by the click which occurs when the plug and socket contact. The absence of any means which hitherto had to be inserted in order to properly space the containers enables the use of blank containers which are open merely at one end, a single welding is all that is required to obtain the completion of the vessel.

Thus the method employed in constructing the improved vessel is exceedingly simple and reliable and considerably reduces the cost of manufacturing. It also makes possible the production of vessels in large quantities and of standard size.

The device has been illustrated by way of example without, however, attempting to point out the possible changes and modifications which may be made within the purview of the invention. It is, therefore, not intended to limit the invention to the precise features of construction and arrangement as shown, but the invention is claimed as broadly as the state of the art permits.

I claim:

1. An insulated vessel comprising two walls having a vacuum space between them, the walls being joined at the mouth, and a single means for centering said walls and permitting limited lateral motion of the inner wall.

2. An insulated vessel comprising two walls secured together at the mouth and having a vacuum space between them, and a single means integral with said walls for centering said walls and permitting limited lateral motion of the inner wall.

3. An insulated vessel comprising double walls integrally connected at the mouth, said walls defining a space of rarefied air, and a single means for limiting relative motions of said walls but permitting access to the entire surface of the walls within the space of rarefied air.

4. An insulated vessel comprising two containers in telescoping arrangement and having a vacuum space between them, the containers being joined at the mouths and being free from contact otherwise, and a single means co-axially disposed for centering said containers and limiting relative motions thereof.

5. An insulated vessel comprising double walls integrally connected at the mouths, said walls having slight relative motions at their bases, and means co-axial with said walls for centering said walls and limiting relative motions thereof.

6. An insulated vessel comprising an inner part and an outer part joined together at the mouth, and means formed on the base of the outer part to permit restricted lateral motion of the base of the inner part.

7. An insulated vessel comprising an inner part and an outer part joined together at the mouth, and integral means formed on the base of the outer part to permit restricted lateral motion of the base of the inner part.

8. An insulated vessel comprising an inner wall and an outer wall joined together at the mouth, and a single means for permitting slight pendular movement of the inner wall without contact with the outer wall, but establishing such contact upon excessive movement.

9. A receptacle comprising an inner and an outer wall with a vacuum therebetween, and a single centering and spacing means between said walls permitting slight relative movements of said walls without contact thereof, but establishing contact upon excessive movements.

10. A receptacle comprising an inner and an outer wall with a vacuum therebetween, and a single spacing and centering means between said walls enabling a silvering solution to reach every portion of said walls.

11. A receptacle comprising an inner and an outer wall, said walls being secured together at one end and free to have relative movements at the other end, there being a vacuum between said walls, and spacing means between said walls normally providing a clearance between said walls and out of contact therewith.

12. A receptacle comprising an inner and an outer wall, said walls being secured together at one end and having relative movements at the other end, and centering and spacing means provided in said vacuum space on the inner and the outer wall and normally out of contact with said walls.

13. A receptacle comprising an inner and an outer wall, said walls being secured together at one end and having relative movements at the other end, there being a vacuum between said walls, and a single means for centering the inner wall with respect to the outer wall, but normally out of contact with said walls to prevent heat conduction.

14. A receptacle comprising an inner wall and an outer wall defining a vacuum therebetween, said walls being secured together at one end and having relative movements at the other end, and a spacing and centering device in said vacuum space normally leaving a clearance between the inner and the outer wall and out of contact therewith.

15. A receptacle comprising an inner and an outer wall, defining a vacuum space therebetween, said walls being secured together at the mouth, and a single spacing and centering device in said vacuum space normally out of contact with the inner and outer walls and permitting a pendular movement of the inner wall of a limited nature.

16. A vessel comprising double walls having a vacuum space between them, the walls being joined at the mouth but otherwise entirely free from contact, and a plug and socket connection between said walls normally maintaining a clearance therebetween.

17. A vessel comprising double walls having a vacuum space therebetween, the walls being joined at the mouth but otherwise entirely free from contact, and a connection between the bases of said walls permitting slight lateral play of said walls.

18. An insulated vessel comprising two walls having a vacuum space between them, the walls being joined at the mouth, a socket formed in the outer wall, and a protuberance from the inner wall loosely extending into said socket.

19. An insulated vessel comprising two walls having a vacuum space between them, the walls being joined at the mouth, the outer wall being formed with a depression, and a protuberance integral with the inner wall loosely received in said depression.

20. An insulated vessel comprising two walls having a vacuum space between them, the walls being joined at the mouth, the outer wall being formed with a depression, and a protuberance integral with the inner wall and originating at the outer surface thereof, loosely received in said depression.

21. An insulated vessel comprising two walls having a vacuum space between them, the walls being joined at the mouth, the outer wall being formed with a depression in the base thereof, and a projection on the base of the inner wall and loosely entering said depression.

22. An insulated vessel comprising two walls having a vacuum space between them, the walls being joined at the mouth, the outer wall being formed with a depression in the base thereof and co-axial with the vessel, and a plug integral with the base of the inner wall and loosely entering said depression but devoid of contact therein.

23. The combination with a vessel comprising two walls joined at the mouth, the outer ceive a protuberance of the inner wall for the centering of the latter, of a casing formed at the bottom with a depression to receive the depression of the outer wall and thereby centering the vessel with respect to the casing.

24. The combination with a vessel comprising two walls joined at the mouth, the outer wall being formed with a depression to receive a protuberance of the inner wall for the centering of the latter, of a casing housing said vessel, a resilient ring formed with a circumferential groove and surrounding the neck of said vessel, and a bottom member in threaded engagement with the lower open end of the casing to force the upper casing end into said groove, said bottom member being formed with a depression to receive the depression of the outer wall and thereby centering the vessel with respect to the casing.

25. The combination with a vessel comprising two walls joined at the mouth, the outer wall being formed with a depression to receive a protuberance of the inner wall for the centering of the latter, of a casing housing said vessel, a resilient ring formed with a circumferential groove and surrounding the neck of said vessel, and a bottom member in threaded engagement with the lower open end of the casing and to force the upper casing end into said groove, said bottom member being formed with a depression to receive the depression of the outer wall and thereby centering the vessel with respect to the casing, and a resilient layer interposed between the depression of the outer wall and of the casing bottom.

26. A vessel comprising an inner and an outer container and means for automatically centering said containers upon insertion of the inner into the outer container, but permitting limited lateral motion of said inner container.

27. A vessel comprising an inner and an outer container, and means integral with said containers for automatically centering the same upon telescoping arrangement of said containers, but permitting lateral motion of said inner container.

28. A double walled glass heat container having the concentric tops of its walls united, and including means for permitting and restricting oscillations of the inner wall, said means being so constructed that normally the union constitutes the only direct path of heat conductivity between the walls of said container.

29. An insulated vessel of frangible character including outer and inner walls hermetically joined at one end and closed at their other ends so as to leave a space between said walls for the formation of a vacuum, and means for centering said walls including one part which is normally spaced from an adjacent part but is so disposed as to prevent substantial relative movements of the free ends of said walls.

30. An insulated vessel of frangible character including walls having contact only at their necks whereby the entire proximate surfaces of said walls may be silvered, and means comprising non-contacting parts for preventing substantial relative movements of the free ends of said walls.

31. A heat insulated receptacle having an inner container and an outer jacket united at their concentric tops, and including means for restricting oscillations of said inner container relatively to said outer jacket, said means being so constructed that it establishes a gap and thus affords no path of heat conductivity when said container is in an upright position.

32. An insulated vessel comprising two walls having a vacuum space between them, the walls being joined at the mouth by a vitreous bond and formed at their bases to be normally free from contact with each other, but establishing contact when the walls have relative motions of a predetermined degree.

In witness whereof I affix my signature.

CHARLES E. BULTMAN.